United States Patent [19]

Louder

[11] 4,046,290

[45] Sept. 6, 1977

[54] DISPENSER SYRINGE APPARATUS HAVING ALTERNATELY DRIVEN CAMS

[75] Inventor: Nevitt M. Louder, Verona, Pa.

[73] Assignee: Fisher Scientific Company, Pittsburgh, Pa.

[21] Appl. No.: 702,408

[22] Filed: July 6, 1976

[51] Int. Cl.[2] .............................................. F16H 28/08

[52] U.S. Cl. ........................................ 222/267; 74/53; 73/425.6

[58] Field of Search .......................... 74/22 R, 53, 54; 222/267, 275, 278; 73/425.6, 423 A; 23/253 R, 259

[56] References Cited

U.S. PATENT DOCUMENTS 3,948,605 4/1976 Atwood et al. .................. 73/423 A

*Primary Examiner*—Stanley H. Tollberg

*Attorney, Agent, or Firm*—Webb, Burden, Robinson & Webb

[57] ABSTRACT

The dispensing apparatus includes a syringe having a plunger therein and appropriate inlet and discharge openings associated therewith. Two cams are positioned in spaced relationship with a connecting rod mounted to an eccentric of each cam and pivotally to the plunger in the syringe. Motor elements cause rotation of one of the cams with the second cam acting as the fixed pivot point to move the plunger through a first distance. Rotation of the second cam with the first cam acting as the fixed pivot point causes the plunger to move through a second distance. Two liquid volumes are, therefore, dispensed from a single syringe in which one-half cycle of rotation of either cam acts to fill the syringe and the other half cycle acts to discharge the syringe. A multistation dispenser is provided by using a plurality of syringes and connecting two such cam assemblies to a cross bar which causes simultaneous reciprocation of the various plungers associated with the plurality of syringes.

18 Claims, 7 Drawing Figures

DISPENSER SYRINGE APPARATUS HAVING ALTERNATELY DRIVEN CAMS

FIELD OF THE INVENTION

My invention relates to dispensing apparatus and, more particularly, to dispensing apparatus capable of dispensing two different volumes from the same syringe.

DESCRIPTION OF THE PRIOR ART

A variety of serological dilution procedures and other general laboratory procedures require the dispensing of two differing volumes of a reagent, diluent, etc. For example, two different volumes of a diluent must be dispensed in preparing two different concentrations of a urine specimen for a quantitative analysis.

Conventionally, two clinical type syringes would be employed with the plunger strokes adjusted to deliver the required volumes. An electromechanical or manual device would power the plungers to effect the deliveries via a cyclic reciprocating motion. The syringes would be equipped with dual check valve plumbed to the diluent source and to the dispenser output.

Multiple syringe-pipette apparatus are also known in which a plurality of pipettes are lowered into a first row of sample tubes and thereafter the pipettes aspirate a preset volume of sample. Thereafter, the pipettes are lowered into successive rows of diluent with the dilution factor obtained by regulation of the volume of the diluent and the volume aspirated.

Certain applications do require the dispensing of two different volumes in series and not necessarily in a repeatable, but in a selectable sequence. In addition, laboratory procedures require a high maintenance of biological asepsis which necessitates sterilizing all of the components intimate with the reagent or diluent, the disposal and replacement of these parts, etc., all of which constitute both a time consuming and economic consideration. A multiple station diluting system merely compounds these considerations since additional complex mechanisms are usually employed in an attempt to maximize efficiency.

SUMMARY OF THE INVENTION

My dispenser provides a single syringe for the dispensing of two preset volumes with the operator having the convenience of selecting the appropriate volumes and the order of the dispensing. This then eliminates one of the two syringes previously used, thereby reducing the maintenance consideration of the biological asepsis. My dispenser can also be utilized in a multidispensing arrangement which multiplies the maintenance savings manyfold.

My dispenser comprises a syringe having a plunger therein. Two cams are positioned in spaced relationship and are joined by a connecting rod mounted to an eccentric of each cam. The connecting rod is further mounted to the plunger which is operable in the syringe. Rotation of one of the cams with the second cam acting as the fixed pivot causes the plunger to move through a first distance whereas rotation of the second cam with the first cam acting as the fixed pivot moves the plunger through a second distance. This then causes the single syringe to dispense two different volumes. A half cycle of rotation of either cam acts to fill the syringe and the second half cycle acts to discharge the syringe. A plurality of such syringes can be utilized to form a multistation dispenser. A cam pair is positioned at each end of the dispenser and the respective connecting rods connect to a cross bar which extends in communication with the various plungers of the syringes which are mounted in line. Activation of the cams causes the cross bar to reciprocate, thereby dispensing the two different volumes from each syringe. Means are provided to sense the presence or absence of a receiving tube next to the syringe so that this syringe will not dispense if a receiving tube is not in place.

DESCRIPTION OF THE PREFERRED EMBODIMENTS

My dispenser assembly, generally designated 10, can be utilized for a wide variety of reagent dispensing needs. For illustrative purposes, my assembly will be described for utilization with a syringe that dispenses a diluent in two different volumes for preparing two concentrations of a urine specimen. Specifically, the first volume is 5 ml. of diluent, whereas the second volume is 1.8 ml. of diluent.

Figure 1:
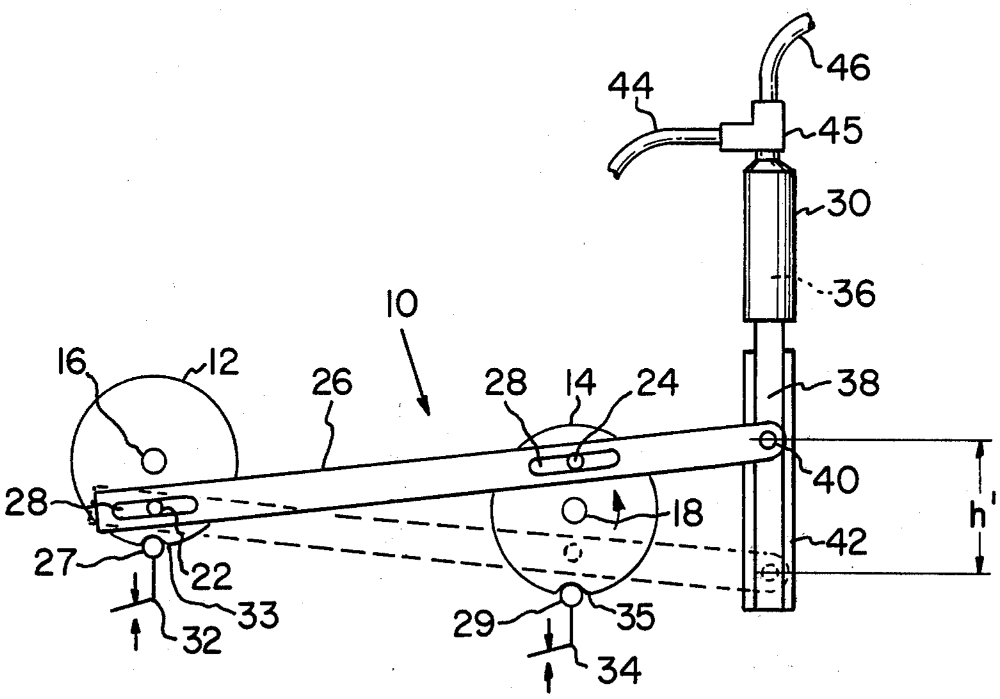
FIG. 1 is a schematic showing my apparatus dispensing a first volume.
Figure 2:
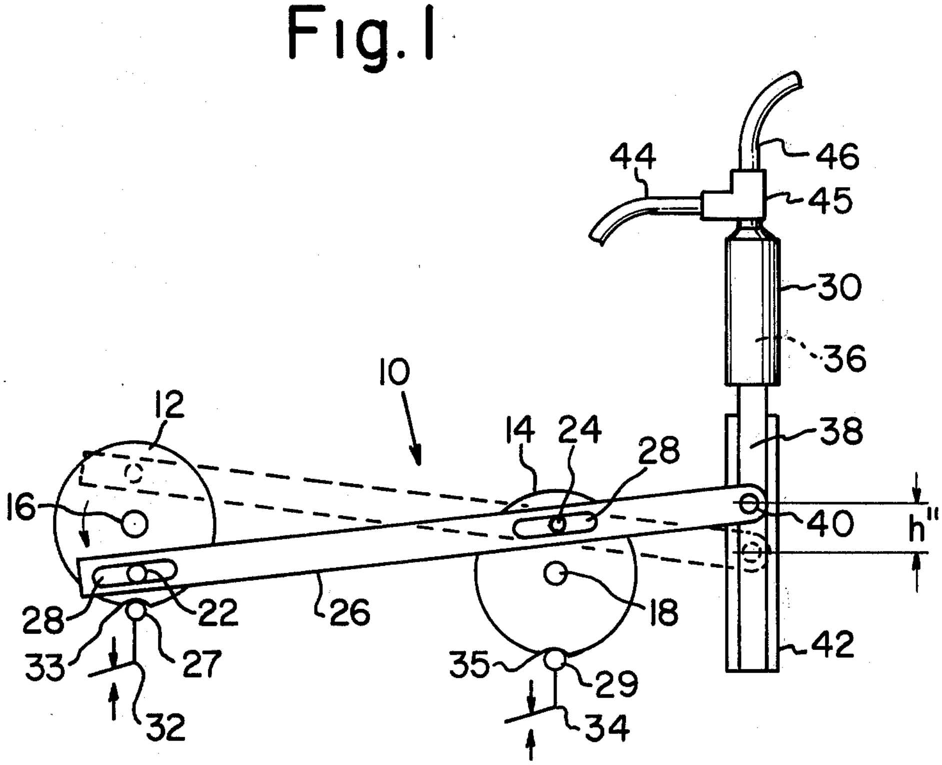
FIG. 2 is a schematic of my apparatus showing it dispensing a second volume.

The basic mechanism of my dispenser 10 is illustrated in FIGS. 1 and 2. The dispenser assembly 10 includes two cams 12 and 14 positioned in spaced relationship. Each cam is adapted to rotate about its respective central cam axis 16 and 18. Extending from each cam 12 and 14 in off-center relationship to each respective cam axis 16 and 18 is an eccentric 22 and 24. A connecting rod 26 joins the two cams 12 and 14. Specifically, the connecting rod 26 includes two slotted ways 28, each of which accommodates an eccentric 22 and 24.

The distal end of connecting rod 26 connects to syringe 30. Specifically, syringe 30 includes a plunger 36 slidably operable therein and a shaft 38 connecting to the plunger 36, FIG. 5. The connecting rod 26 mounts through pivot pin 40 to the bottom of shaft 38, FIGS. 1 and 2. Shaft 38 is operable in a vertical guideway 42 to impart the linear motion to the plunger 36. Adjacent the top of syringe 30 in open communication therewith is an elbow coupling 45. An inlet hose 44 connects to coupling 45 as does a discharge hose 46. Positioned within inlet and discharge sections of elbow coupling 45 are check valves 58 and 60 which permit the syringe 30 to be filled on the one hand, and to be dispensed on the other hand, FIG. 5.

The single syringe arrangement of FIGS. 1 and 2 works as follows. When cam 14 is caused to rotate, cam 12 is stationary and eccentric 22 becomes the fixed pivot for the connecting rod 26, FIG. 1. The rotational motion of cam 14 is then translated to a vertical motion of shaft 38 which moves the plunger 36 within syringe 30 through a distance represented by $h'$ in FIG. 1. With the syringe 30 already filled from a previous cycle, the first 180° of rotation of cam 14 causes connecting rod 26 to move from the position shown by the dotted lines to the position shown by connecting rod 26 through the distance *h'*. This then causes the syringe to discharge an amount equivalent to the distance *h'* which in the present example is 5 ml. The second one-half cycle of rotation of cam 14 reverses the direction of travel of shaft 38 thereby causing the syringe to fill or replace the 5 ml. of diluent.

Activation of cam 12 places the fixed pivot at the eccentric 24 of cam 14 thereby causing the connecting rod 26 and shaft 38 to move through a distance designated *h''*, FIG. 2. The distance *h''* in the subject example is 1.8 ml. Once again, with the syringe 30 being filled from a previous cycle and cam 12 rotating with cam 14 acting as the fixed pivot, the first 180° of rotation of cam 12 causes a dispensing of 1.8 ml. whereas the second 180° of rotation causes the syringe 30 to refill itself by an equivalent amount. The filling and dispensing cycles work in conjunction with simple poppet valves 58 and 60 within the elbow 45, FIG. 5, although electrically operated check valves could likewise be employed. It will, of course, be recognized that the first 180° of rotation can be a filling cycle rather than a dispensing cycle.

Figure 3:
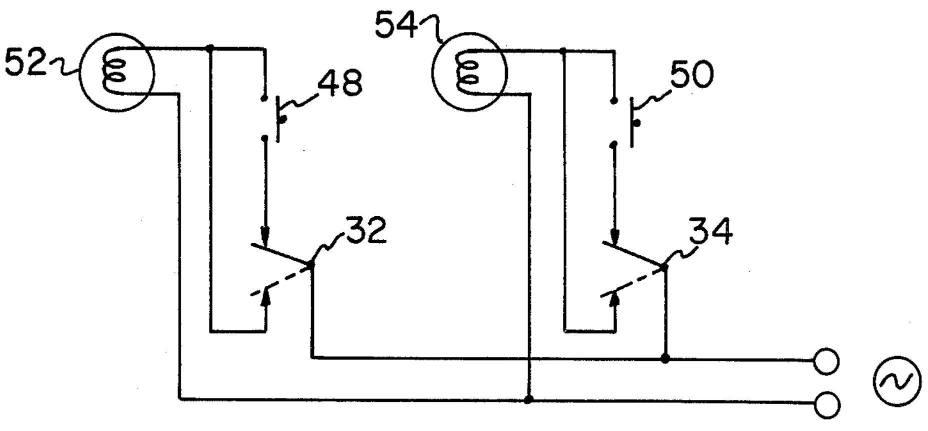
FIG. 3 is a schematic of the electric circuit which functions to operate my dispenser.
Figure 4:
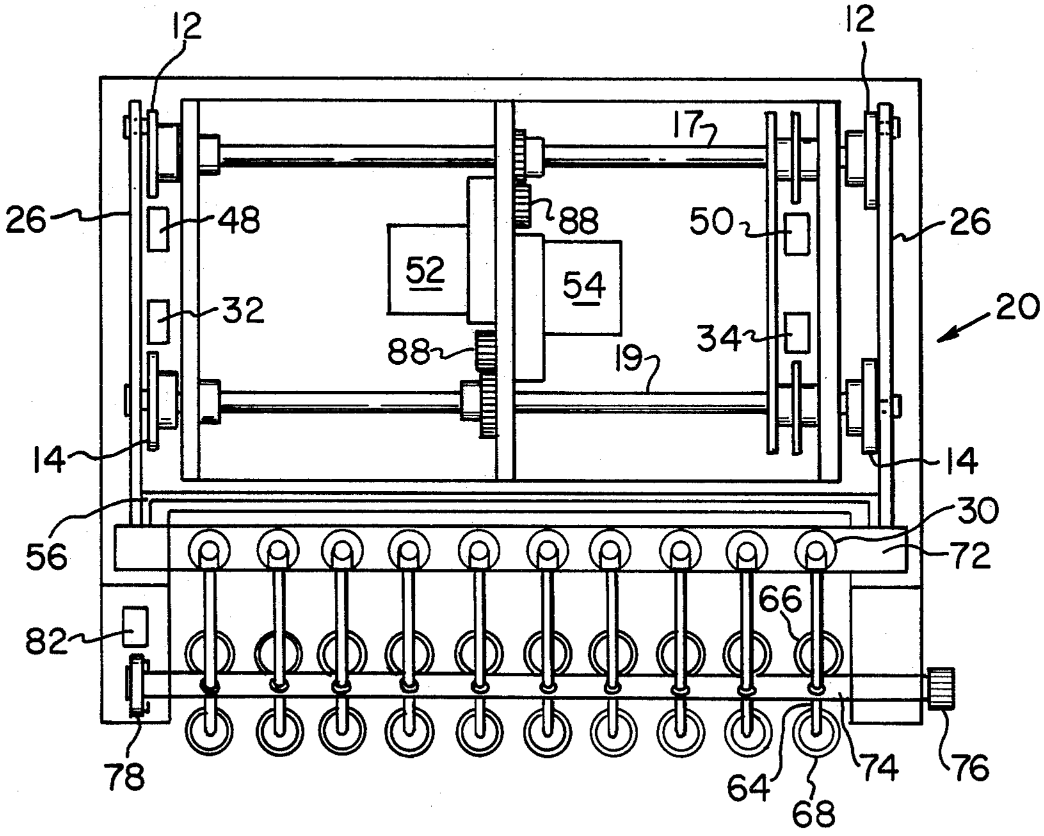
FIG. 4 is a schematic in plan showing a multistation dispenser.

The dispensing of either the 5 ml. or 1.8 ml. volume is determined by the operation of the particular motor 52 or 54 connected as parallel circuits, FIG. 3. Specifically, with respect to cam 12, a mechanical detent 27 positioned in recess 33 located on the periphery of cam 12 prevents cam 12 from rotating in the at rest position, FIGS. 1 and 2. When pushbutton 48 is depressed, the motor 52, power supply and pushbutton 48 are in series to start the cam 12 to rotate and override the detent 27. Detent 27 then acts as a cam follower riding on the periphery of cam 12. The movement of detent 27 from its initial position wherein it acts as a stop to the periphery of cam 12 acts to close switch 32, thereby forming a closed in series circuit between the power source, the motor 52 and switch 32. Specifically, switch 32 is of the single pole double throw type so that the circuit remains closed as long as the detent is positioned along the cam periphery. Depression of pushbutton 48 merely initiates the cam 12 rotation and thereafter a circuit is formed by the closing of switch 32 as the detent 27 keeps switch 32 closed through the balance of the 360° of rotation.

In a similar manner, depression of button 50 initially causes motor 54 to override detent 29 positioned in recess 35 and permits cam 14 to start rotating, FIGS. 1–3. Thereafter, the switch 34 is held in the on position through the remainder of the 360° of rotation as detent 29 rides about the periphery of cam 14 to maintain the closed circuit between the power source, motor 54 and single pole double throw switch 34.

The eccentrics 22 and 24 are adjustable with respect to their distance from the respective cam axis 16 and 18. The adjusting mechanism, which can be a simple, eccentric slot and threaded fastener lock, permits a fine adjustment to assure that the plunger 36 moves through the desired distance and dispenses and fills the proper volume of diluent or reagent.

My cam arrangement can also be embodied into a multistation dispenser 20, FIGS. 4 through 7. The particular multistation dispenser 20 illustrated, simultaneously operates ten syringes 30 to alternately dispense into 20 test tubes arranged as ten test tube pairs 66 and 68, FIG. 4. The syringes 30 are vertically mounted on the face of the dispenser 20 and the syringe plunger shafts 38 are engageable with a horizontal cross bar 72. Two cam assemblies 10 of the type described hereinabove are commonly driven or driven in synchronization and utilized to reciprocate the horizontal cross bar 72 to fill and dispense the syringes 30. These cam assemblies 10 are positioned along the opposing sides of the multistation dispenser 20. Specifically, the cams 12 are joined by a cam axle 17 extending along the cam axis 16. Cams 14 are operated through cam axle 19 extending along the cam axis 18 of the two cams 14. Motors 52 and 54 drive the cam axles 17 and 19 through appropriate gearing 88 in a conventional manner. The connecting rods 26 of each cam assembly pivotally connect at their distal ends to the cross bar 72. The rotary motion of the cam assemblies is, therefore, translated into a linear reciprocating motion to cause the cross bar 72 to move up and down by a distance controlled by the cam settings.

Figure 5:
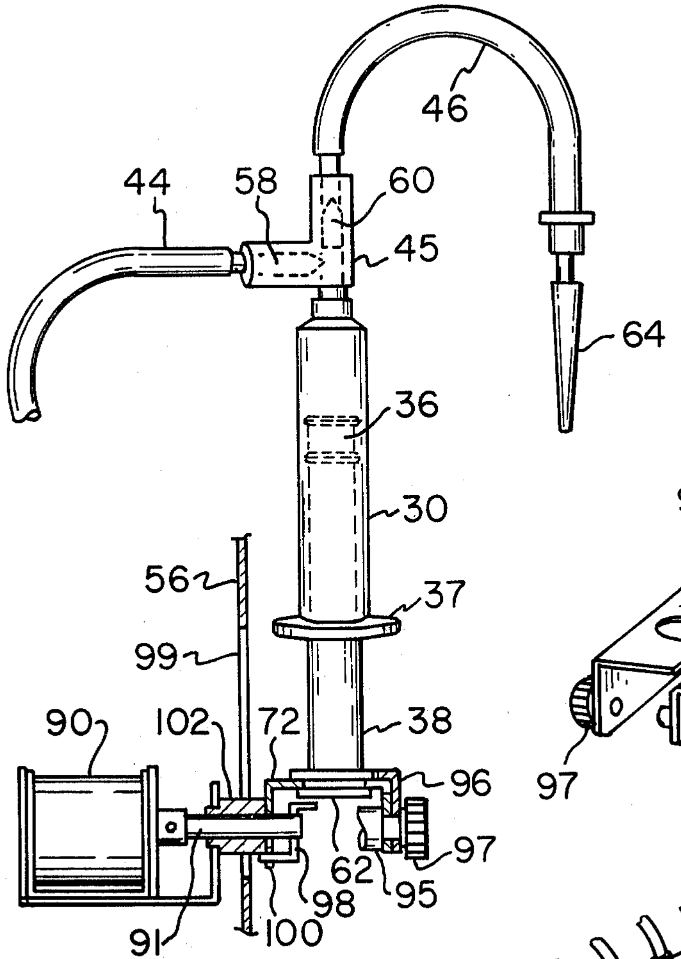
FIG. 5 is an elevation partly in section showing the syringe mounting of the multistation dispenser.
Figure 6:
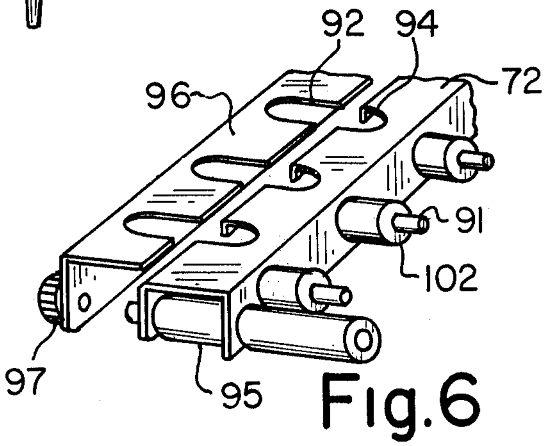
FIG. 6 is a broken away perspective of the syringe mounting rack.

The multidispenser embodiment includes a mechanism for sensing the presence or absence of a receiving tube in a standard receiving tube rack (not shown), FIGS. 5 and 6. In order to prevent the subsequent dispensing into a vacated position, it is necessary to disengage the associated syringe system from the cross bar 72. The actual sensing is done by a series of miniature switches with sensitive actuators (shown schematically at 71) mounted along the bottom face of the dispenser 20. The switches are positioned so that the sensitive actuators detect the presence or absence of each tube 66 and 68 of the tube pairs by engagement or communication with wire 73 extending to the tubes 66 and 68. Each set of test tubes includes a tube 66 for receiving 5 ml. of diluent and a test tube 68 for receiving 1.8 ml., FIGS. 6 and 7.

The syringes 30 are mounted and positioned as follows. Each syringe 30 includes a flange 37, FIG. 5, retained in a clip (not shown) mounted on the face of the dispenser 20. The elbows 45 are above the surface of the dispenser cabinet so that the inlet hoses 44 and discharge hoses 46 remain exposed. This allows a malfunctioning such as a blockage or leak to be quickly perceived, permits optical UV radiation for sterility maintenance and provides for a quick exchange of fittings, valves, syringes, tubing, etc. The cross bar 72 includes a plurality of slots 94 which accommodate the plungers 38 of the various syringes 30, FIGS. 5 and 6. A clamping bar 96 including a plurality of mating slots 92 engages the cross bar 72 to maintain the plungers 38 in communication with the cross bar 72. Clamping bar 96 is mounted to cross bar 72 by means of knurled thumbscrews 97 which engage internally tapped connectors 95 at opposing ends of the cross bar 72. The ends of connectors 95 are coupled to the connecting rods 26 in vertical guideways similar to guideways 42 illustrated in FIGS. 1 and 2.

Attached to the cross bar 72 are ten solenoids 90, each in alignment with the communicating recesses 92 and 94 which house the syringes 30, FIGS. 5 and 6. Each solenoid 90 has an operable arm 91 which extends through an appropriate armature bearing 102 which is free to reciprocate in slots 99 in the front panel 56 of the dispenser 20, FIG. 5. Arm 91 connects at its end to a clip 98 which has a clip guide 100 mounted in the cross bar 72 to prevent any rotation of clip 98. Clip 98 is positioned beneath bottom flange 62 of shaft 38 of the plunger 36. As will be described hereinafter, clip 98 actually communicates the movement of the cross bar 72 to the syringe 30.

If the mini switch 71 detects the absence of a tube 66 or 68, the appropriate solenoid 90 is activated so that arm 91 retracts and withdraws the clip 98 that normally projects under the flange 62 of the syringe plunger 36. In the normal position, the clip 98 functions, when engaged, to transfer the reciprocating motion of the cross bar 72 to the syringe 30 which is captured onto the cross bar 72 by means of the clamping bar 96. If the clip 98 is withdrawn by the solenoid 90 due to an absent tube in the particular location, the cross bar 72 ascends along the unengaged length of the plunger shaft 38 without affecting a dispense. A minimum mechanical clearance exists between the plunger flange 62 and the surface of the engaging clip 98 to insure re-engagement of the plunger shaft 38. The clearance is maintained to allow re-entry of the clip 98 for re-engagement.

Figure 7:
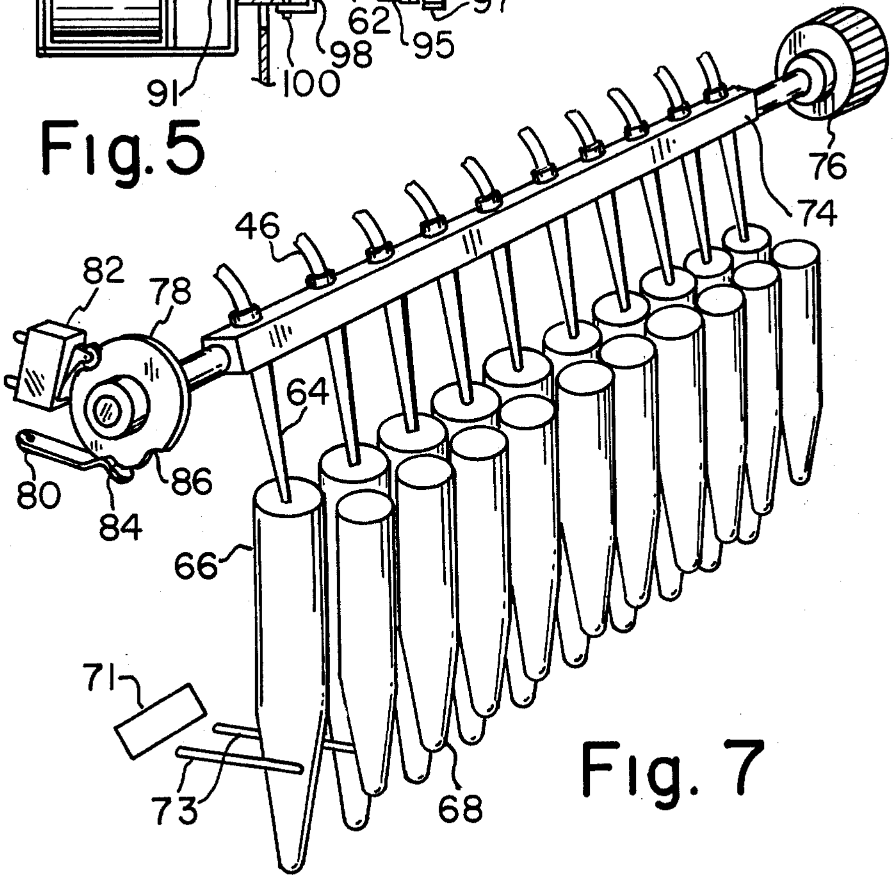
FIG. 7 is a perspective of the dispense probe bar assembly.

The appropriate dispense volume and sequence can be selected by adjusting the dispense probe bar 74 which houses the ten dispense probes 64 from the ten respective syringes 30, FIGS. 5 and 7. Specifically, dispense probe bar 74 connects at one end to a selector knob 76 and at the other end to a cam 78. Cam 78 include two cam recesses 84 and 86 which are engageable by a lock bar 80 suitably mounted to dispenser 20. The operator, upon presenting the rack of ten tube pairs to the dispenser 20, rotates the selector knob 76 so that the probe bar 74 is aligned to communicate the dispense probe 64 with a particular tube of the test tube pair. In so doing the cam 78 is retained by lock bar 80 into one of the cam recesses 84 or 86. Associated with cam 78 is switch 82 which acts through a cam notch to tie in with either motor circuit 52 or 54. Initiation of a common circuit pushbutton switch (not shown) by the operator then dispenses the selected volume of diluent into the correct tube of each tube pair.

I claim:

1. A dispensing apparatus comprising:

A. a syringe having a plunger therein and fill means and discharge means associated therewith;

B. first and second cams positioned in spaced relationship;

C. a connecting rod joining the two cams and the plunger; and

D. means to rotate the first cam while the second cam acts as the fixed pivot to move the plunger through a first distance and to rotate the second cam while the first cam acts as the fixed pivot to move the plunger through a second distance.

2. The dispensing apparatus of claim 1, wherein each cam includes an eccentric associated therewith, said connecting rod connected to the eccentrics.

3. The dispensing apparatus of claim 2 wherein the connecting rod includes a slotted way for cooperation with each cam eccentric.

4. The dispensing apparatus of claim 1, said connecting rod pivotally connected to a shaft extending from the plunger.

5. The dispensing apparatus of claim 4, said shaft operable in a guideway to impart linear motion to the plunger.

6. The dispensing apparatus of claim 1, including adjustment means for displacing the eccentric of each cam from the cam axis of rotation to control the distance of travel of the plunger.

7. The dispensing apparatus of claim 1 whereby one-half cycle of rotation of either cam acts to fill the syringe and another half cycle acts to discharge the syringe.

8. The dispensing apparatus of claim 1, said rotation means comprising two parallel circuits, each circuit associated with a cam and including a power supply, a motor for turning the cam and switching means, said switching means comprising a first switch to initiate rotation of the cam and override a detent from an at rest postition and a second switch activated by the detent being overriden to maintain a moving position of the cam until it returns to its at rest position.

9. The dispensing apparatus of claim 8, said first switch being a pushbutton switch and said second switch being a single pole double throw switch, the single pole being in series with the power supply, pushbutton switch and motor in the at rest position and in series with the power supply and motor in the moving position.

10. The dispensing apparatus of claim 9, said detent riding on the periphery of the cam during the moving position to maintain the second switch in series with the power supply and motor and said detent engaging a recess in the cam in the at rest position.

11. A multistation dispenser for dispensing two liquid volumes from a single syringe comprising:

A. a plurality of syringes mounted in line to the dispenser, each syringe having a plunger operable therein and fill means and discharge means associated therewith;

B. pairs of receiving tubes in line with the discharge means;

C. a cross bar extending in communication with the plungers; and

D. at least one cam assembly mounted to the cross bar to cause reciprocation thereof, said assembly including first and second cams positioned in spaced relationship, each having an eccentric mounted thereto, a connecting rod mounted to the eccentrics of each cam and to the cross bar, and means to rotate the first cam while the second cam acts as a fixed pivot to move the cross bar through a first distance and corresponding syringe volume and to rotate the second cam while the first cam acts as a fixed pivot to move the cross bar through a second distance and corresponding syringe volume, whereby a portion of the cycle of rotation of either cam acts to fill the syringe and a remaining portion acts to discharge the syringe.

12. The multistation dispenser of claim 11, including two cam assemblies, each mounted to substantially an opposing end of the cross bar and operated in synchronization to cause said reciprocation.

13. The multistation dispenser of claim 11, including a probe bar containing dispenser probes, each dispenser probe attached at one end to the discharge means and at the other end adapted to discharge into the pair of receiving tubes.

14. The multistation dispenser of claim 13, including means to rotate the probe bar to position the dispenser probe into one of the tube pairs, said means adapted to activate the cam rotation means in synchronization therewith to sequentially dispense the first and second syringe volume to the receiving tube pair.

15. The multistation dispenser of claim 11, including means to detect the absence or presence of a receiving tube prior to the discharge of the liquid.

16. The multistation dispenser of claim 15, said means comprising a clip connected to a solenoid and adapted for movement thereby between a first position communicating the cross bar to the plunger and a second position in which the cross bar is out of communication with the plunger, said solenoid activated by mini switches mounted to the dispenser and activated by the receiving tube.

17. The multistation dispenser of claim 16, the cross bar having a plurality of slots to accommodate the plungers, said clip engaging the bottom of the plunger in the first position to transfer to reciprocating motion of the cross bar to the plunger and not engaging the plunger bottom in the second position so that the cross bar ascends along the plunger without engaging it.

18. The multistation dispenser of claim 17, including a clamping bar having a plurality of slots, said clamping bar connected to the cross bar with the clamping bar slots aligned with the cross bar slots to capture the plungers on the cross bar.

* * * * *

UNITED STATES PATENT AND TRADEMARK OFFICE

CERTIFICATE OF CORRECTION

PATENT NO. : 4,046,290

DATED : September 6, 1977

INVENTOR(S) : Nevitt M. Louder

It is certified that error appears in the above-identified patent and that said Letters Patent are hereby corrected as shown below:

Column 1 Line 23 "valve" should read --valves--.

Claim 17 - Column 7 Line 8 "to" (second occurrence) should read --the--.

Signed and Sealed this

*Twentieth* Day of *December 1977*

[SEAL]

*Attest:*

RUTH C. MASON
*Attesting Officer*

LUTRELLE F. PARKER
*Acting Commissioner of Patents and Trademarks*